३,२३२,८१२
PROCESS AND DEVICE FOR THE LINING OF HOLLOW BODIES
Guido Max Rudolf Lorentz, Espa, near Butzbach, and Rudolf Stroh, Hofheim, Taunus, Germany, assignors to Farbwerke Hoechst Aktiengesellschaft vormals Meister Lucius & Bruning, Frankfurt am Main, Germany, a corporation of Germany
Filed June 29, 1962, Ser. No. 205,845
Claims priority, application Germany, June 30, 1961, F 34,305
2 Claims. (Cl. 156—293)

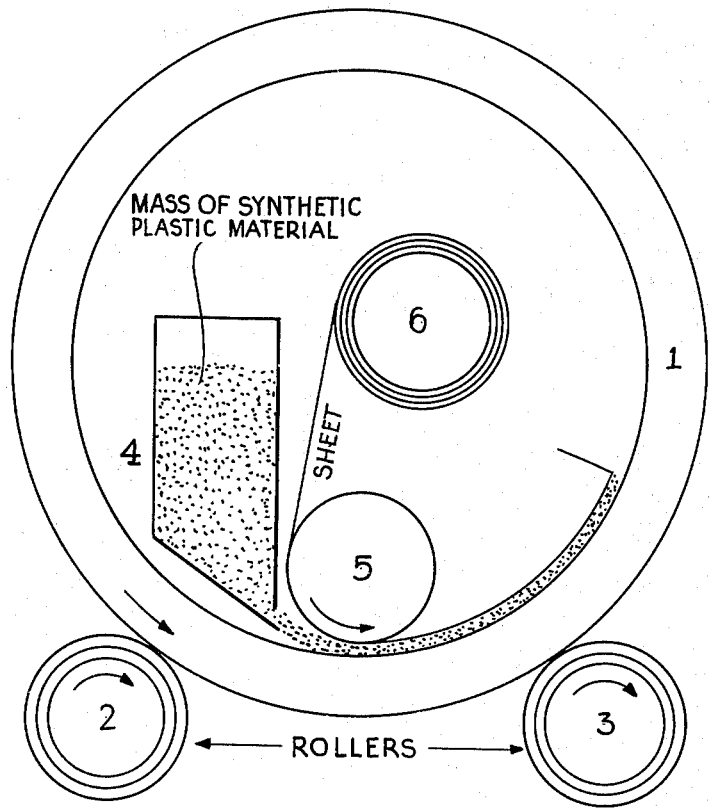

The present invention relates to a process and a device for the lining of hollow bodies, preferably tubes, for example iron or steel tubes, above all concrete tubes, by applying a trowelling mass, in which process, with the aid of a suitable device and a smooth sheet of a synthetic plastic material which is neither dissolved nor attacked by the binding agent of the trowelling mass, a mixture of synthetic plastic materials capable of being trowelled, is rolled by mechanical means on a hollow body, for example a tube.

The attached figure shows, as an example of an embodiment of the invention, a device for carrying out the method. In this figure are a hollow body 1 to be lined, preferably a tube, driving rollers 2 and 3 by which the hollow body 1 is given a rotating motion. From a reservoir 4 the trowelling mass emanates under the action of gravity or by the application of pressure, which trowelling mass is thus placed before a roller 5 which is a guide roller for the smooth sheet of plastic material reeling off a feed roller 6. In addition to serving as a guide roller for the sheet, the roller 5 also serves as a pressure roller which compresses the mass of the synthetic plastic material and at the same time permits to adjust the desired thickness of layer of the mass to be applied.

As trowelling masses of synthetic plastic materials there may be used masses on the basis of liquid phenol resins, furan resins, epoxide resins, unsaturated polyester resins and unsaturated polyester resins modified with isocyanate.

It is a characteristic feature of a trowelling mass that it hardens in the cold state and that it is filled in a certain ratio which depends on the respective binder used with a suitable filler in order to attain the highest possible mechanical strength. Suitable fillers for phenol-, furan- and polyester resins are, for example, fillers on the basis of quartz or on the basis of artificial graphite or hardburned coal. As fillers for epoxide resins there have proved to be especially suitable fillers containing quartz, to which may be added clay or asbestos and, in smaller quantities, also carbon.

According to the process of the invention also mixtures may be applied which consist of synthetic resins and fibrous materials, primarily asbestos, furthermore glass fibers, possibly in the form of fleeces or textile fabrics. According to the novel process there are in each case obtained hollow bodies, for example tubes, that have an extraordinarily smooth internal surface. This is especially of great advantage when liquids are passed through the hollow bodies that have been provided with a protective layer, for example tubes, since there is only given a low coefficient of friction on account of the smooth surface.

It is, furthermore, possible in the process of the invention by the use of suitable binders to apply internal layers on the hollow bodies to be lined, for example tubes, which layers possess the highest possible resistance to corrosive waters or media that are to be passed through the hollow bodies. In the case of tubes it is especially important that the adhesion of the protective layers applied is high. For example, in the case of concrete tubes or tubes made of asbestos cement the adhesion shall be higher than the inherent tensile strength of the concrete or the asbestos cement. In the case of steel tubes the adhesion between the protective layer applied and the steel shall at least amount to 50 kg./cm.$^2$, preferably to 100 to 150 kg./cm.$^2$.

As sheets there may be used in the novel process especially sheets of plastic materials that can neither be dissolved nor swollen by the binding agent of the trowelling mass nor otherwise be attacked by chemicals or mechanical means. For trowelling masses on the basis of phenol- and furan resins there are especially suitable, for example, sheets of polyolefins, such as polyethylene, or sheets of polyterephthalic acid glycol esters or of polytrifluorchlorethylene or polytetrafluorethylene. For trowelling masses on the basis of epoxy resins or unsaturated polyester resins there are especially suitable sheets of polyterephthalic acid glycol esters, of polytrifluorchlorethylene or polytetrafluorethylene.

We claim:
1. A process for the lining of a hollow body which comprises applying to the inner surface of a rotating hollow body a trowelling mass hardenable in the cold state comprising a hardenable synthetic plastic material as binding agent and a filler, pressing against said trowelling mass a smooth sheet of plastic material capable of resisting solution and swelling by the binding agent of the trowelling mass, thereby compacting the trowelling mass and forming a smooth interior lining in the hollow body.

2. A process as claimed in claim 1 wherein the hollow body is a tube.

References Cited by the Examiner
UNITED STATES PATENTS

| | | | |
|---|---|---|---|
| 1,979,656 | 11/1934 | Whitman | 156—244 XR |
| 2,120,309 | 6/1938 | Carson | 25—38 |
| 2,133,035 | 10/1938 | Morain. | |
| 2,343,225 | 2/1944 | Pray et al. | 156—294 XR |
| 2,424,878 | 7/1947 | Cook | 156—294 |
| 2,428,385 | 10/1947 | Reynolds | 156—446 |
| 2,470,068 | 5/1949 | Contenson | 25—38 |
| 2,678,677 | 5/1954 | Hervey et al. | 156—446 |
| 2,960,425 | 11/1960 | Sherman | 156—187 XR |
| 3,031,365 | 4/1962 | Marchioli et al. | 156—294 |
| 3,075,868 | 1/1963 | Long | 156—244 XR |

EARL M. BERGERT, *Primary Examiner.*